O. A. KENYON.
ARC WELDING.
APPLICATION FILED MAY 22, 1919.
1,326,743.  Patented Dec. 30, 1919.
2 SHEETS—SHEET 1.
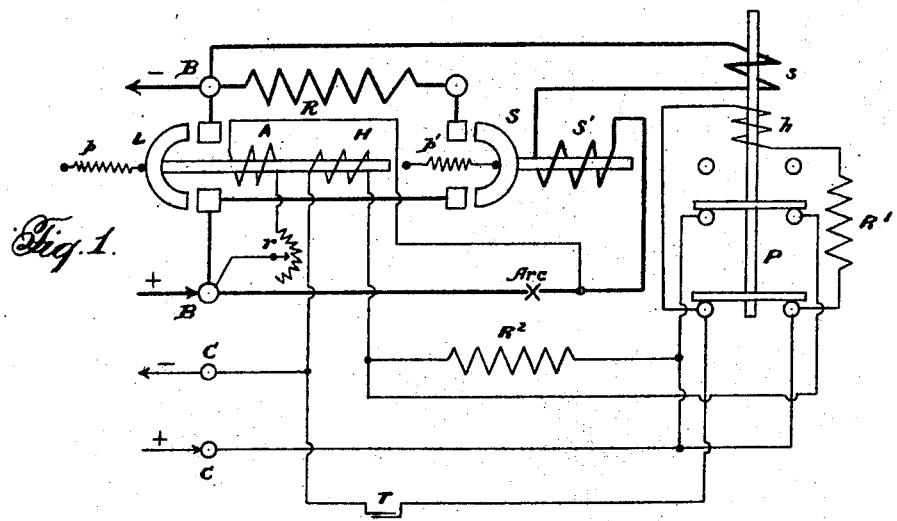
Fig. 1.
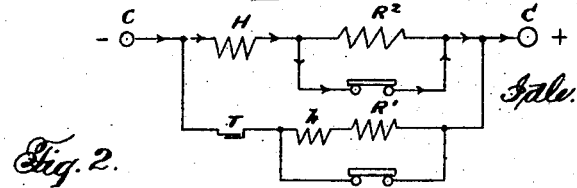
Idle.
Fig. 2.
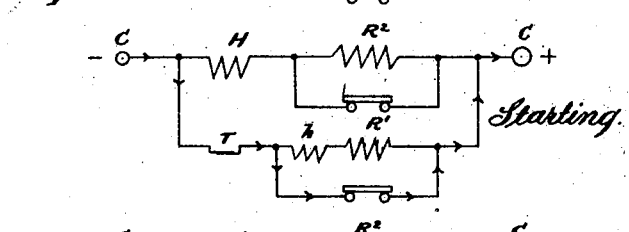
Starting.
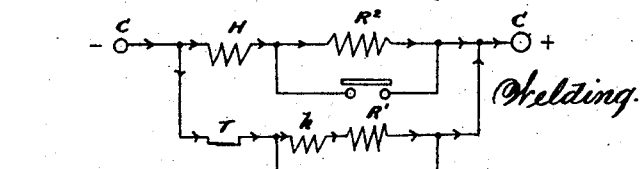
Welding.
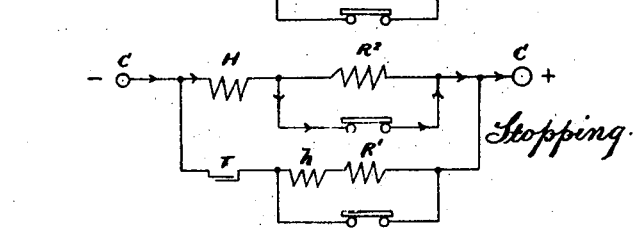
Stopping.
Witness:  
Jas. Es. Hutchinson
Inventor  
Otis A. Kenyon.  
By J. Walter Fowler, Attorney

O. A. KENYON.
ARC WELDING.
APPLICATION FILED MAY 22, 1919.

1,326,743.

Patented Dec. 30, 1919.
2 SHEETS—SHEET 2.

*Idle and Voluntary Stop.*

*Starting and Welding.*

*Automatic Stop. I.*

*Automatic Stop II.*

Inventor:
Otis A. Kenyon.
By J. Walter Fowler.
Attorney:

Witness:
Jas. E. Hutchinson.

UNITED STATES PATENT OFFICE.

OTIS ALLEN KENYON, OF NEW YORK, N. Y.

ARC-WELDING.

1,326,743.     Specification of Letters Patent.     Patented Dec. 30, 1919.

Application filed May 22, 1919. Serial No. 298,827.

*To all whom it may concern:*

Be it known that I, OTIS A. KENYON, a citizen of the United States, residing at New York city, in the county of New York and State of New York, have invented certain new and useful Improvements in Arc-Welding, of which the following is a specification.

My invention relates to certain new and useful improvements in arc welding, and it consists, essentially, in the employment in a system of arc welding having a welding arc circuit adapted to receive an electric current from an appropriate source, of a means to prevent the current again passing through the arc circuit after the arc is stopped until said means are manually released.

My invention also consists of the arrangement and combination of features which I will hereinafter describe and more fully point out in the appended claims.

In the accompanying drawings forming part of this specification, and in which similar reference characters indicate like parts in the several views;

Figure 1 is a diagrammatic representation of the circuit connections of a typical controller for insertion in a closed circuit arc-welding system.

Fig. 2 is a diagram illustrating the successive connections, of coils and resistors for the idle, starting, welding and stopping stages of my improved system.

Figure 3:
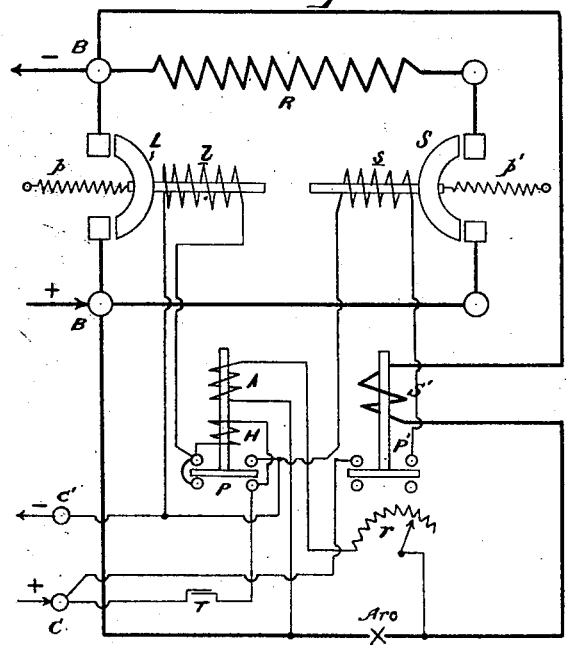
Fig. 3 shows substantially the arrangement of Fig. 1, but using a constant-potential control circuit, instead of a constant-current control circuit.

It is recognized by those skilled in the art that arc welding has been extremely limited in its application, on account of the fact, that results are dependent almost entirely on the skill of the operator. Therefore, in order to develop the application of arc welding, it has been necessary to train operators with the greatest care, and even so, there has been great hesitancy on the part of engineers to permit the use of arc welding, on account of the fact that results were dependent to such a degree upon the operator. The present invention has to do with the reduction of skill required in the handling of the arc, and also the prevention of incorrect practice on the part of the welder. By this invention, as I will hereinafter show, I remove absolutely the possibility of certain undesirable practices of the welders.

The production of a satisfactory arc weld, as it is known today, involves six factors, as follows:

1. Current in the arc.
2. Voltage across the arc.
3. Size of welding electrode.
4. Design of joint.
5. Design of welding jigs and fixtures.
6. Physical and chemical nature of the welding electrode.

From these recited factors it will be apparent that all the items can be determined by an expert welder for a given welding operation, and that once determined, if there is present means of assuring the maintenance of these factors independently of the operator, there can be made certain the production of welds that can be inspected after their completion and judged as to their value from this inspection.

The two factors that have been left in the hands of the operator, are the current in the arc, and the voltage across the arc. The closed-circuit system of my prior Patent No. 1,181,227, dated May 2, 1916, furnishes a means of controlling the current and limiting the length of the arc. However, practice has demonstrated, that although this control is perfect, there are circumstances under which the operator does not avail himself thereof either voluntarily or accidentally. For instance, in the said closed-circuit system as I have heretofore operated it, it was possible for the operator to annul the arc-limiting feature by holding his remote control switch, which was located in the welding handle. To overcome this, I devised a system which is covered by my prior Patents Nos. 1,218,267, dated February 7, 1917, and 1,218,269, dated February 7, 1917. However, these patented devices, although they permit the welder to stop voluntarily without any rise of energy, and prevent him from deliberately annulling his arc limit control, did not prevent him from striking an arc repeatedly without allowing sufficient time for the control apparatus to act.

In the present invention I have added a novel feature, which prevents the welder from making a succession of contacts with the work, without allowing sufficient time for the apparatus to function. Introduction of this time-element which is forced upon the operator, makes it impossible for the operator to circumvent the controlling action of the apparatus upon his arc.

In Fig. 1 I show the circuit connections of the typical controller for insertion in my aforesaid prior patented closed-circuit system. The terminals of the controller BB are, it will be seen, connected in series in the line, and the terminals CC are connected to a constant current source of excitation. When not welding, the contactors, L and S are closed by the action of the holding coil, H, in the first instance, and by the spring $p'$ in the second instance. In operation, when the welder is ready to start work, he closes the contacts T located preferably in the handle of the welding tool. This short-circuits the coil, H, which by the action of the spring $p$, allows the contactor L to open; the contactor S being closed; it will be observed that the resistor R is connected across the terminals BB, causing a voltage drop which is designed to be sufficient for starting an arc. Once contact is made at the arc, the current passes through the series coil, $s$, on the pilot relay P and the series coil S' on the contactor S, thereby opening the relay P and the contactor S respectively. The opening of this contactor S removes the starting resistor R, leaving the arc alone in series with the line. The aforesaid opening of the pilot relay P, removes the short-circuit across the coil $h$ and the resistor R', and also removes the short-circuit across the resistor $R^2$. The net result is, that the coil A on the contactor L is connected across the arc and the coil H is connected in parallel with coil $h$ and the resistor R' and is in series with the resistor $D^2$. Therefore, by properly proportioning the resistances H, $R^2$, $h$ and R', any desired portion of the control line current can be made to pass through the coil H. The welding operation can continue as long as the arc is held sufficiently short to prevent the closing of the contactor, L, by current shunted through coil A, and the length of the arc which will close the contactor L may be adjusted by the rheostat $r$. If the operator desires to stop welding without drawing out his arc, he simply releases the contacts T which forces the full-control line current through the coil H by opening the shunt circuit. This current is sufficient to close the contactor L.

If the operator draws too long an arc, and is shut off by the operation of the contactor L, this arc will be quenched by the short-circuit, through the contactor L. It will be understood that the contactor S will be closed by its spring $p'$ as soon as the current through the series coil S' ceases. However, the pilot relay P will remain in its upper position, held there by the coil $h$, as long as the operator holds the contacts T closed. Therefore, in order to start again, it will be necessary for the operator to release the contacts and allow the relay P to drop into its starting position, before he can release the coil, H, by closing the contacts, T. Therefore, it will be apparent that a time element represented by the time required for the relay P to pass from the welding to the starting position, is introduced between each successive operation of the arc. Also, when the arc is extinguished automatically, the welder is prevented from striking a quick succession of false arcs, by which he could produce disturbances on the line that would affect other welders working on the same circuit.

In the arrangement of Fig. 2 I show the successive connections of the coils H and $h$, and the resistors $R^2$ and R' for idle, starting, welding and stopping, which will make it easier to follow the operation of the contacts T.

Fig. 3 shows the application of the same principles to the same system, using constant-potential control circuit, instead of constant current control circuit. In this case, I have also employed a pilot relay for the contactor S, although this has nothing to do with the present invention.

The operation of the arrangement of Fig. 3, is as follows:

Normally the parts are in idle condition. The contactors L and S are closed by the action of their springs $p$ and $p'$. However, in practice, it is sometimes advisable to hold the contactors closed by the action of their exciting coils instead of the springs. This, however, is simply a matter of local expediency. The pilot relays P and P' are shown in Fig. 3, in their lower positions.

To start welding, the operator closes the contacts T, which connects the excitation coil, 1, across the control circuit, thereby opening the contactor L and inserting the resistor R across the terminals BB of the controller. When the arc is struck, the current is drawn through the coil, S', lifting pilot relay P' which connects the coil $s$ across the control circuit, opening the contactor S and cutting the starting resistor R out of circuit. The welding function continues until the operator either releases the contacts T or draws too long an arc. Current is shunted around the arc through the coil A and therefore increases with the length, or voltage, of the arc. When the proper current is reached, the pilot relay P lifts short-circuiting coil 1, and inserting across the line the coil H, the relay being held aloft until the contacts T had been opened. In this case, as in the previous one, the operator can stop at any time by opening the contacts T which cuts off the excitation current and allows the contactor L to close. The length of arc at which the arc is short-circuited by the said contactor L, may be adjusted by the rheostat r. The use of coil H on the relay P prevents the operator from striking a succession of arcs without releasing contacts T and allowing the relay P to return to the starting position.

Figure 4:
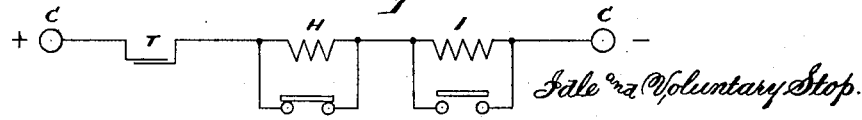
Fig. 4 is a diagram showing the idle, starting, welding and stopping connections of coils and contacts for the interlocking operation of the relay, P.
Figure 4:
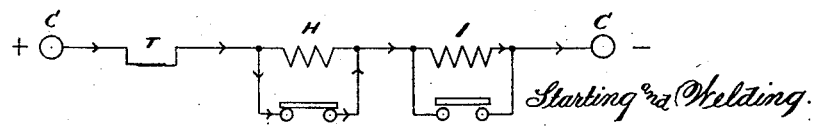
Figure 4:
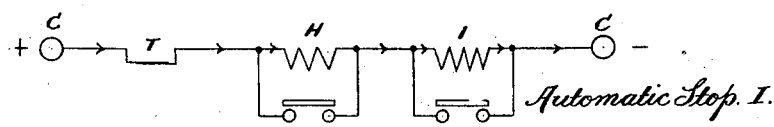
Figure 4:
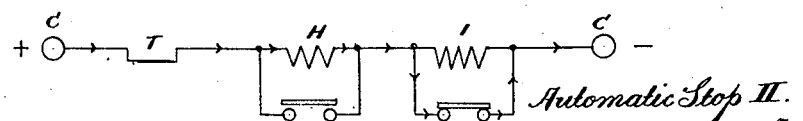

Fig. 4 shows the idle, starting, welding and stopping connections of the coils 1 and H and contacts T, so as to make clear the interlocking operation of the relay P.

There are various other ways in which these same principles can be accomplished. The foregoing methods have been shown, simply to illustrate the application of the system, the objects of which are to prevent the operator from annulling the arc limit control voluntarily; to permit him to stop at will; to prevent him from starting a succession of arcs without allowing sufficient time to elapse to allow the control apparatus to operate properly. In practice, this time element is about one-tenth of a second, so that it does not reduce production, but on the contrary, on account of forcing proper operating technique increases production.

Having thus described my invention what I claim as new and desire to secure by Letters Patent is:

1. In electric welding, a source of electricity, a welding arc circuit adapted to receive current from said source, and means to prevent the current again passing through the arc circuit after the arc is stopped until said means are released by the operator.

2. In electric welding, a source of electricity, a welding arc circuit adapted to receive current from said source, and means actuated when the current is passed through the arc circuit to prevent the current again passing therethrough after the arc is stopped until said means are released by the operator.

3. In electric welding, a source of electricity, a welding arc circuit adapted to receive current from said source, mechanism set in action by the current passing through said arc circuit, said mechanism adapted to prevent the current again passing through the arc circuit after the arc is stopped until released by the operator.

4. In electric welding, a source of electricity, a welding arc circuit adapted to receive current from said source, mechanism controlled by a separate source of electricity and adapted to be set in action by the current passing through the arc circuit, to prevent the arc circuit again receiving current after the arc is stopped until said mechanism is released by the operator.

5. In electric arc welding, a welding arc, means for stopping the arc by shunting the current therefrom, and means to prevent the restarting of the arc after being stopped until said means are released by the operator.

6. In electric arc welding, a welding arc, means for stopping the arc by shunting the current therefrom, and mechanism for automatically maintaining the shunting until released by the operator.

7. In electric arc welding, a welding arc means for shunting the current therefrom at a predetermined voltage across the arc, and means for automatically maintaining the shunting until released by the operator.

8. In electric arc welding, a welding arc, means for stopping the arc by shunting the current therefrom, and mechanism operated by a separate source of electricity to maintain the shunting until released by the operator.

9. In electric welding a source of electricity, a welding arc circuit adapted to receive current from said source, and means to prevent the current again passing through the arc circuit after the arc is stopped until said means are released by the operator and a period of time has elapsed after the releasing.

10. In electric arc welding, a welding arc, means for shunting the current therefrom at a predetermined voltage across the arc, or by the operator at will, and means to prevent the arc restarting until a period of time has elapsed.

11. The method of controlling a welding arc, said method consisting, essentially, in introducing into the welding arc circuit, a time-element and controlling said element by current passing through the arc circuit to thereby prevent the welder from annulling the arc limit and making a succession of contacts with the work, without allowing sufficient time for the welding function to be performed.

In testimony whereof I affix my signature.

OTIS ALLEN KENYON.